May 26, 1970  D. K. REFER ET AL  3,513,921
CONVEYOR BELT SCALE
Filed Jan. 8, 1968
7 Sheets-Sheet 1
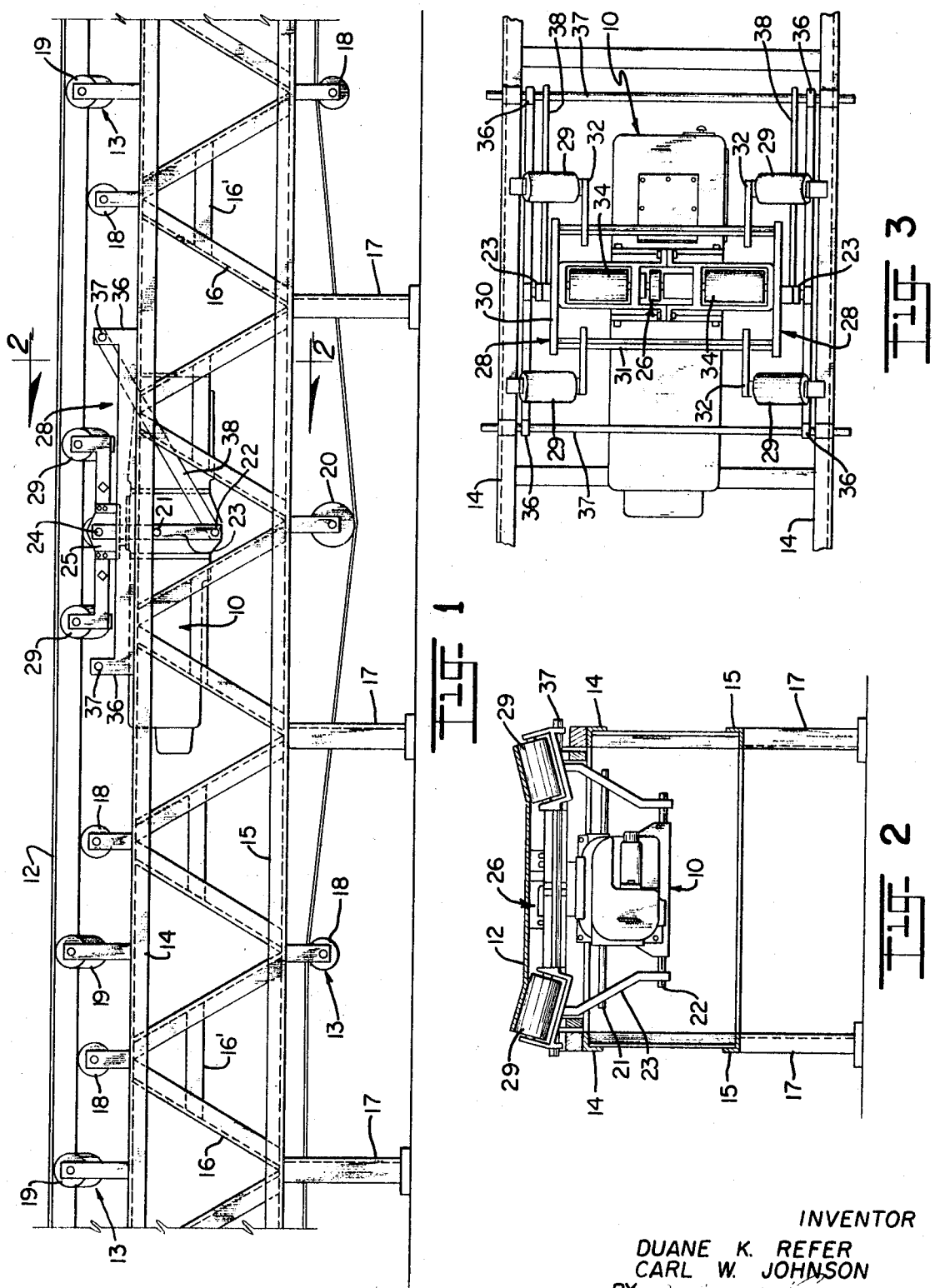
INVENTOR
DUANE K. REFER
CARL W. JOHNSON
BY
ATTORNEY

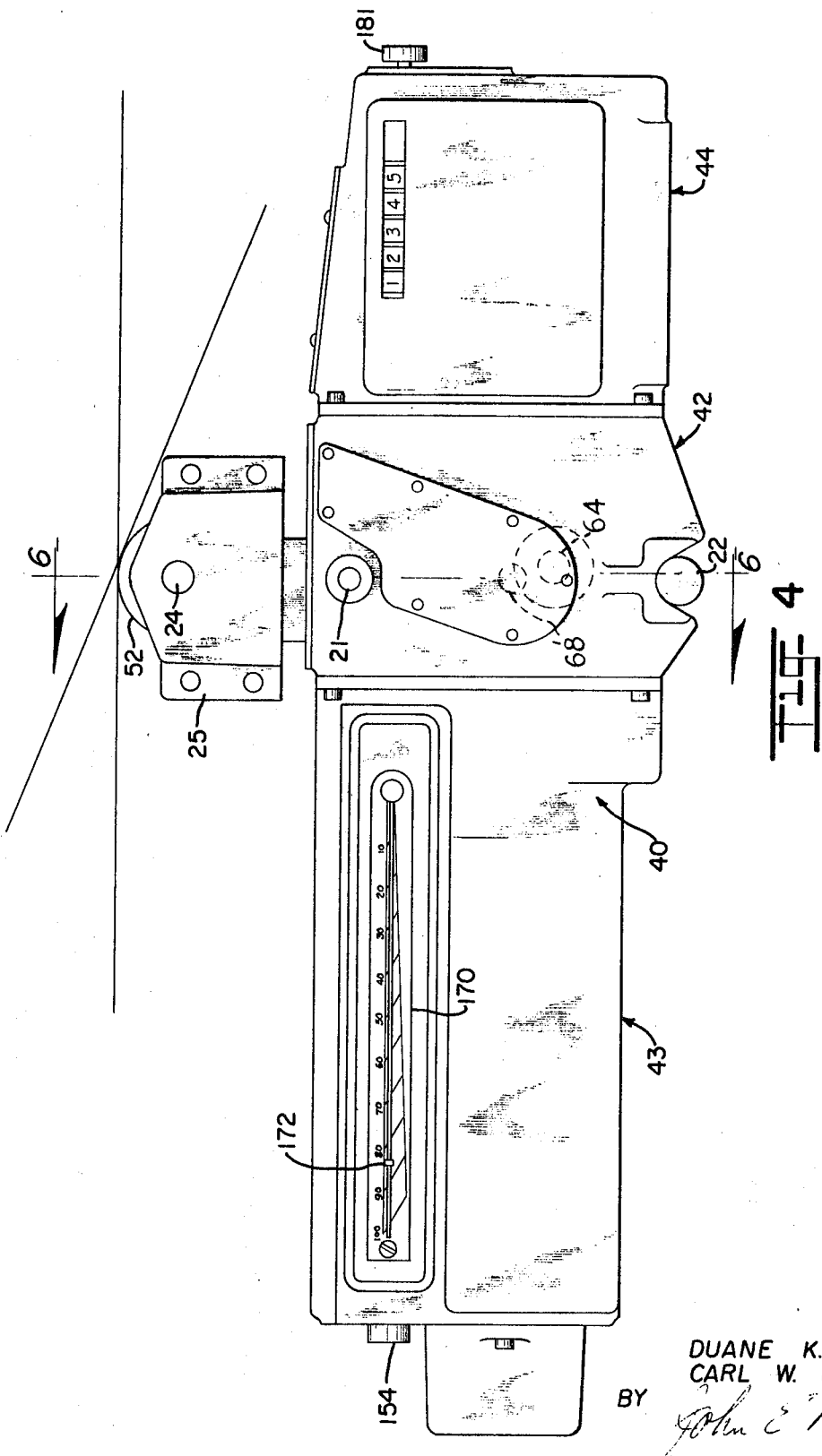

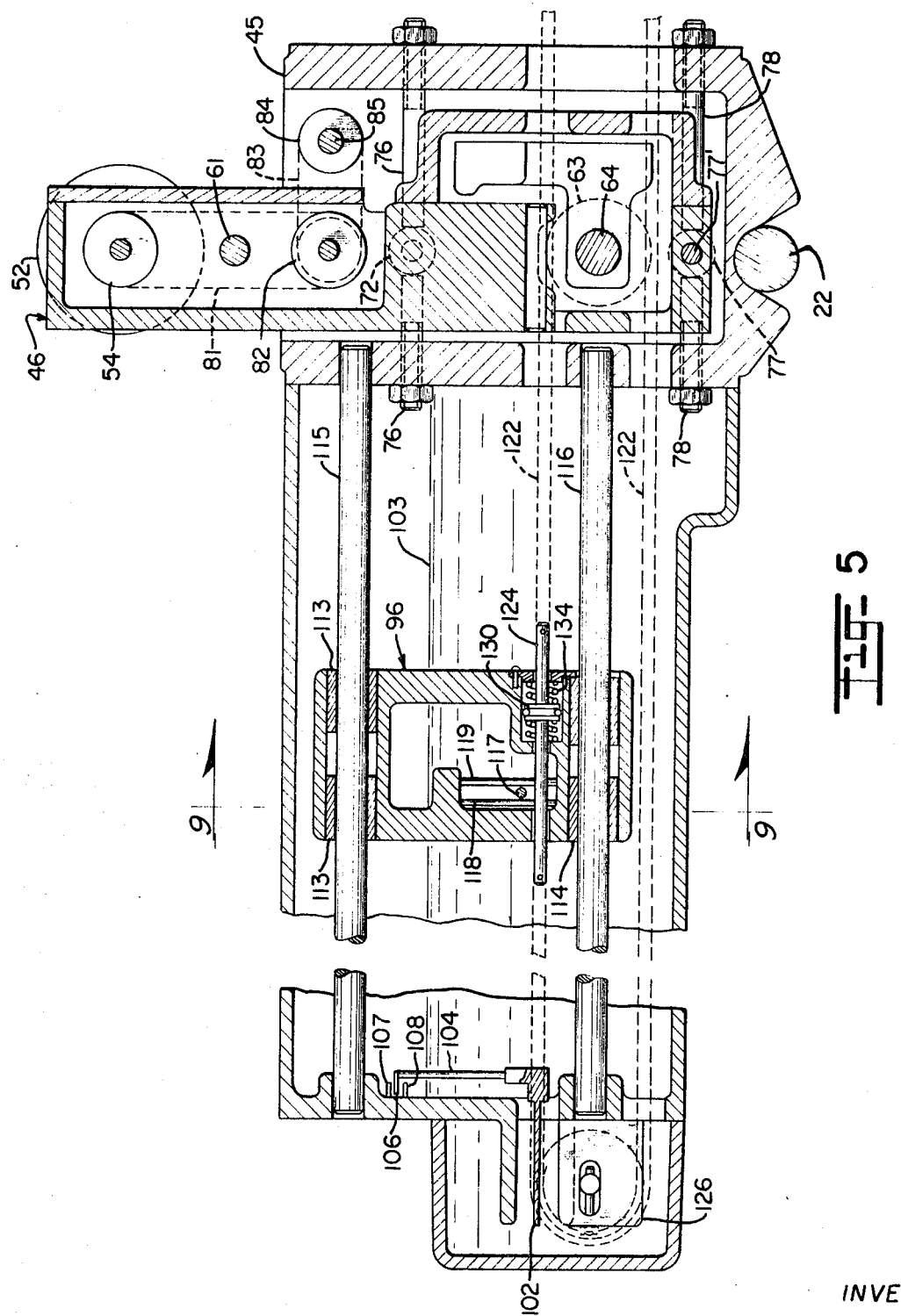

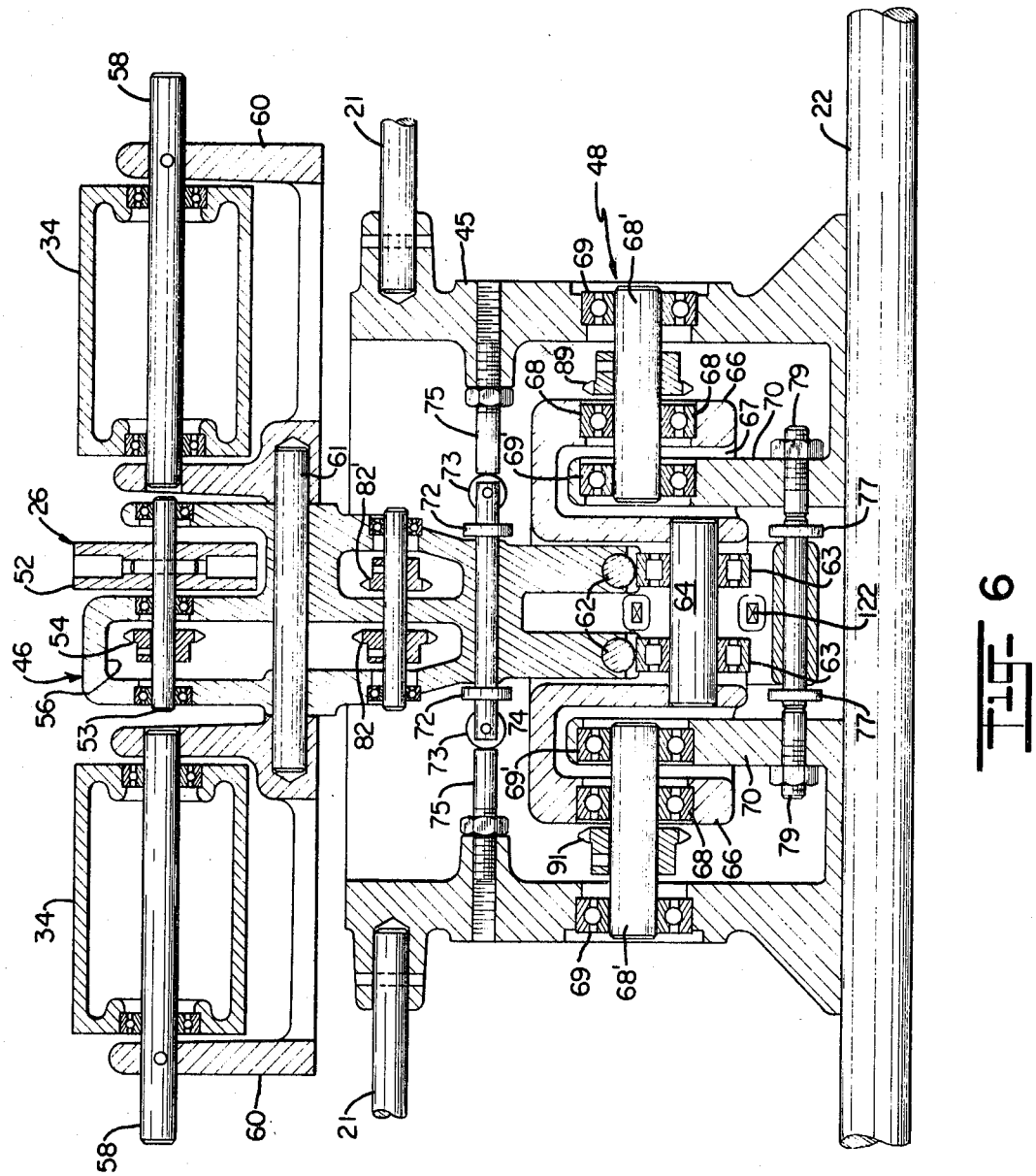

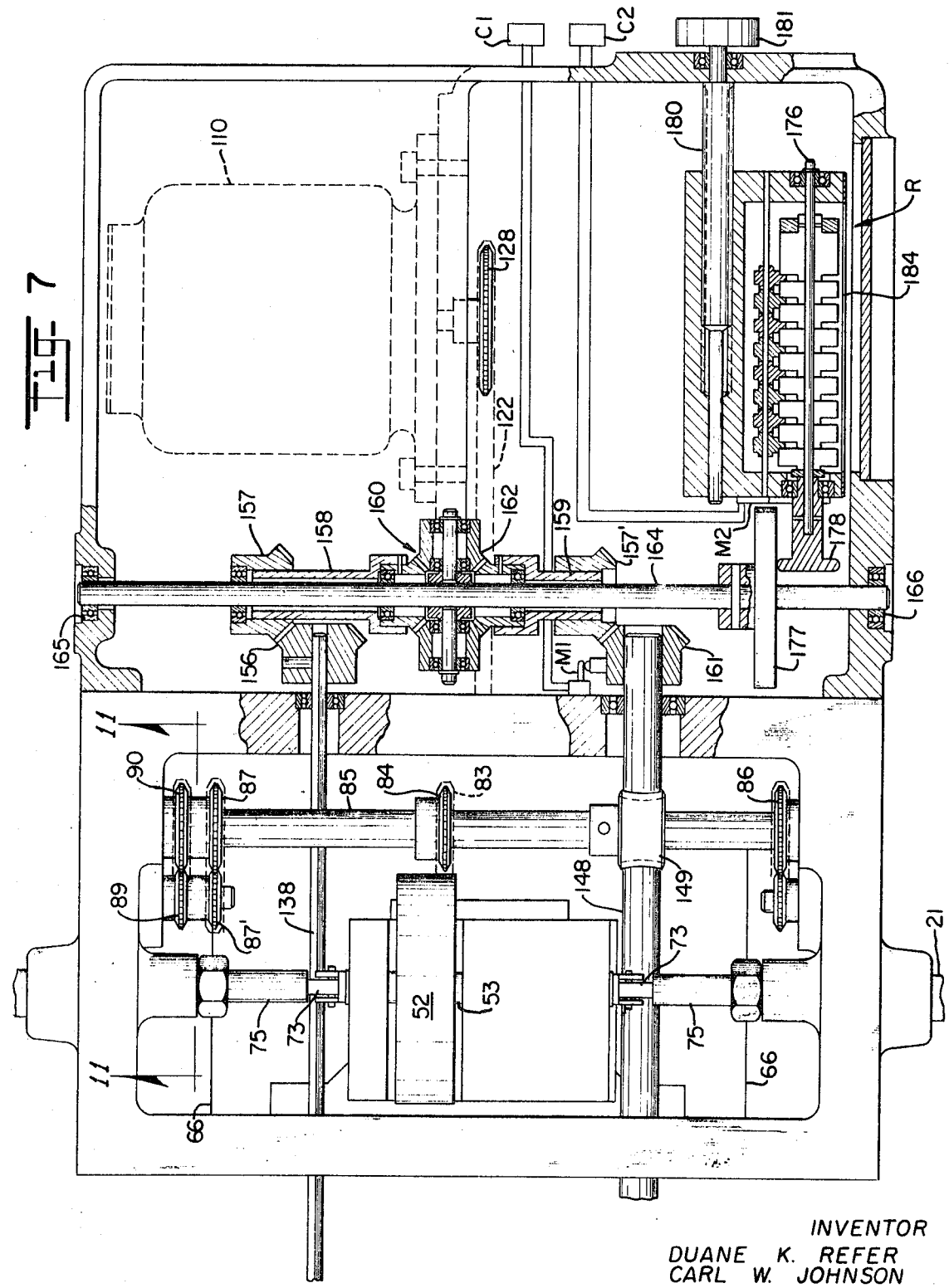

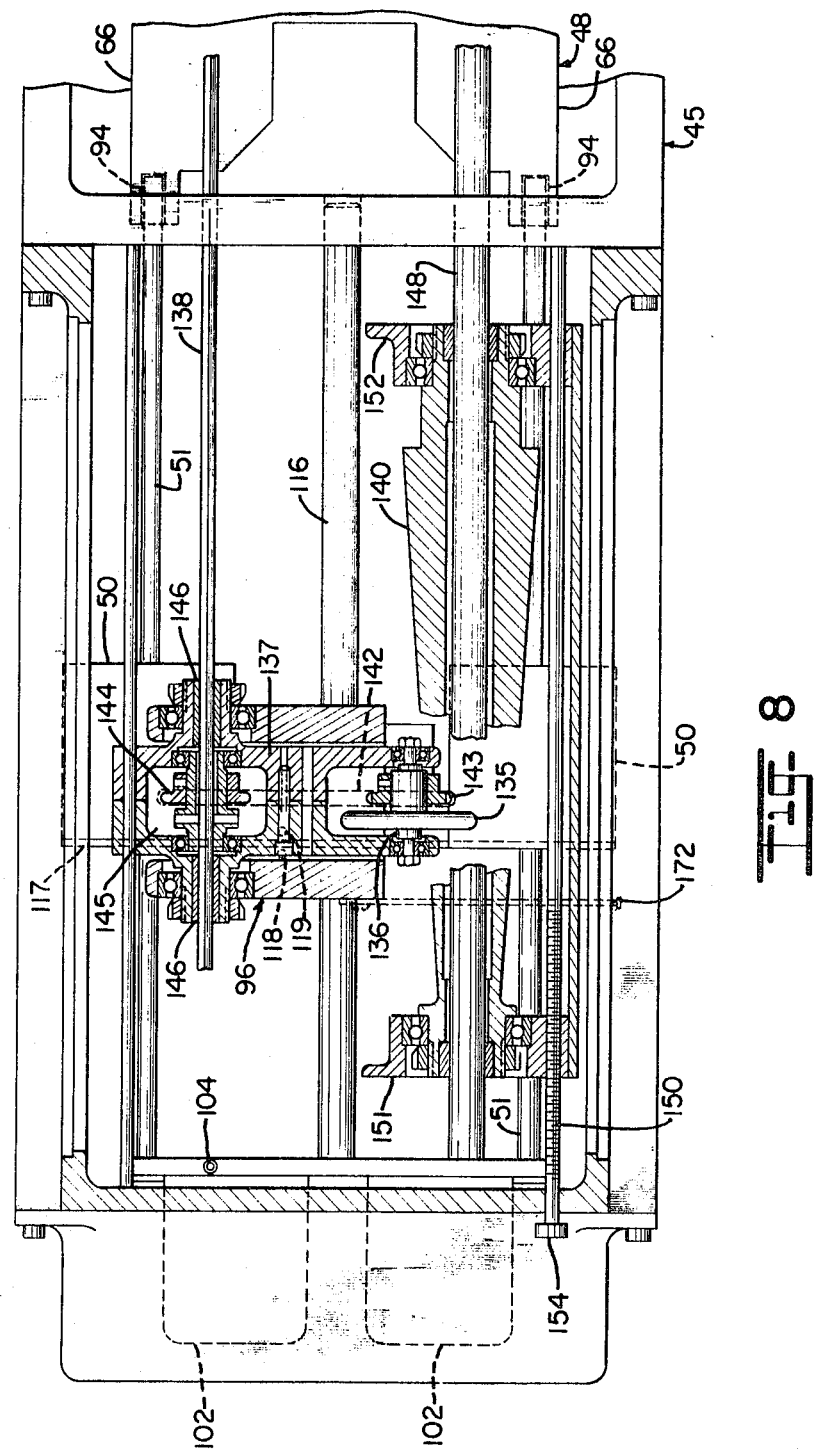

May 26, 1970  D. K. REFER ET AL  3,513,921
CONVEYOR BELT SCALE
Filed Jan. 8, 1968  7 Sheets-Sheet 7
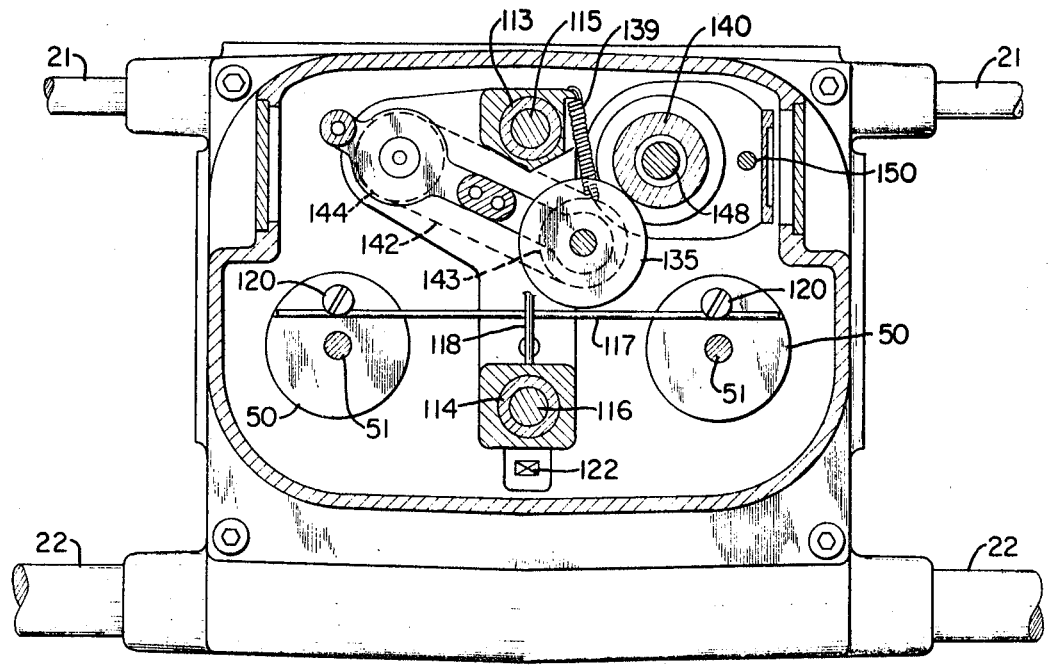
Fig. 9
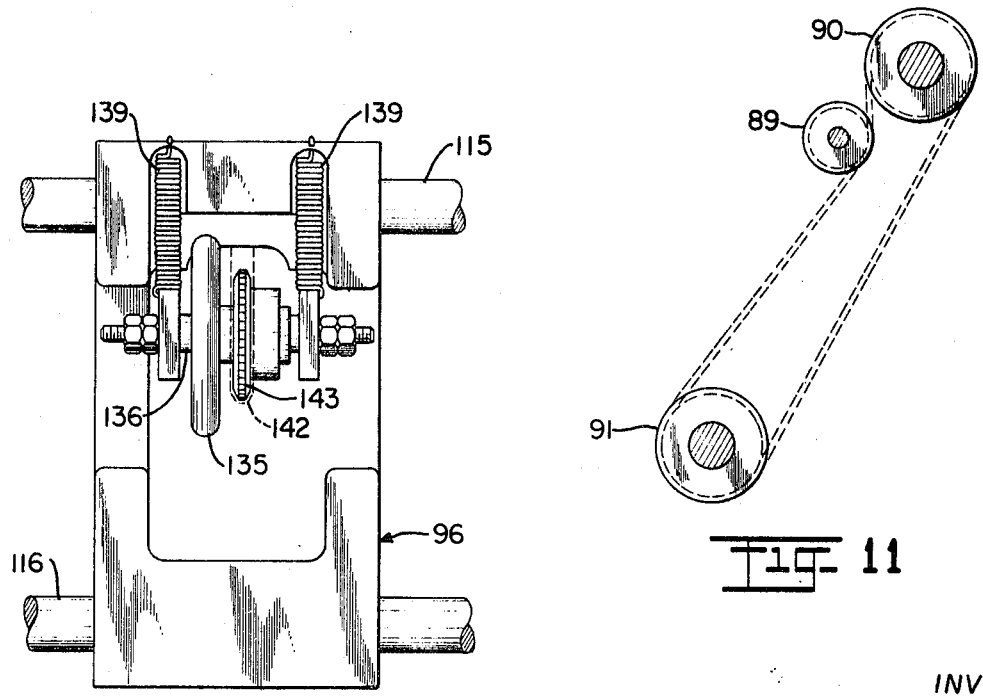
Fig. 10
Fig. 11
INVENTOR
DUANE K. REFER
CARL W. JOHNSON
BY John E. Reilly
ATTORNEY

United States Patent Office 3,513,921
Patented May 26, 1970

3,513,921
CONVEYOR BELT SCALE
Duane K. Refer, 2360 S. Jersey, Denver, Colo. 80222, and Carl W. Johnson, Neenah, Wis.; said Johnson assignor to said Refer
Filed Jan. 8, 1968, Ser. No. 696,287
Int. Cl. G01g 11/14
U.S. Cl. 177—16                16 Claims

ABSTRACT OF THE DISCLOSURE

In the present invention, a compact scale unit is suspended beneath a load-carrying conveyor belt and includes a dynamic pivot bearing assembly capable of transmitting the weight of the belt and material directly to a balance beam assembly without the use of knife-edge pivots, linkages or joints, fluid or electrical components. The unit is capable of weighing, integrating and recording the cumulative weight of the material transported on the belt, can be rapidly and accurately calibrated and permits accurate, sensitive weighing of material at different belt angles.

---

This invention relates to weighing machines, and more particularly relates to a conveyor belt scale unit adaptable for weighing, integrating and recording the cumulative weight of a moving load.

In weighing a moving, variable load, mechanical and electrical systems presently in use generally necessitate rather complicated and bulky mechanisms to weigh and to integrate or combine the weight and speed of the load. For instance, those devices employing a balance beam with a knife edge pivot are capable of handling limited loads, become easily worn and fail to provide the stable, accurate alignment required for continuous weighing of a moving load. In the past however attempts to substitute other forms of fulcrums or pivots have been unsuccessful largely due to the friction and inertia introduced into the system. Also, the balance beam assemblies associated with the fulcrum or pivot have introduced certain inaccuracies into measurement of a load because of the difficulty of damping extraneous oscillations and vibrations as well as faulty positioning of the balance beam in relation to the fulcrum or pivot point on the scale.

Moreover, devices employed to integrate and to totalize the weight and conveyor speed readings have not readily lent themselves to rapid, accurate calibration. In general, the devices are rather bulky and are not capable of mounting within a unitary housing with the scale unit and have required highly skilled technical personnel to operate and maintain.

It is therefore an object of the present invention to overcome the above and other difficulties and drawbacks in conveyor belt scale units by providing for a novel and improved system mounted within a unitary, compact housing which is adapted for installation on a conveyor frame and which is further capable of weighing, integrating and recording both instantaneous and integrated weight values in a highly accurate, sensitive manner with a minimum of external adjustment required to calibrate and to weigh the material and notwithstanding variations in the belt angle.

It is another object of the present invention to provide for a novel and improved form of conveyor scale unit which incorporates within a single housing means for accurately sensing the weight and speed of a moving load, and specifically for sensing and recording instantaneous weight values without integration as well as for combining and integrating weight and speed values; and further to indicate and record totalized weight and speed values.

It is a further object of the present invention to provide in a conveyor belt scale unit for a rapid, simplified means of calibration which will permit when installed a visual comparison of the accuracy of instantaneous and total weight values with a minimum of external adjustment required; and furthermore wherein the unit can be readily adjusted and calibrated for sensing the weight of material transported at different belt angles.

It is a still further object of the present invention to provide in a conveyor scale unit for a new and useful form of dynamic pivot bearing and balance beam assembly which achieves greatly increased accuracy and sensitivity by minimizing, to the extent of substantially eliminating, striction, inertia, extraneous oscillations and vibrations.

The present invention broadly contemplates the use of a modular conveyor scale unit which is pivotally suspended beneath a conveyor belt employed for transporting a variable load. Installed within the housing is a weigh block having an upper weight-sensing pulley to sense the weight and speed of movement of the material, and the weight being transmitted vertically through the weigh block to weigh bearings which are suspended between a pair of counter-rotating pivot bearing assemblies. A balance beam assembly extends forwardly through a fluid-filled section of the housing in a common horizontal plane with the pivot bearing and weigh bearings, and a reversible electric motor senses positive and negative pivotal deflection of the balance beam assembly to advance counterweights on the balance beam assembly to a position compensating for the increase or decrease in weight applied. Pivotal deflection of the balance beam assembly may be damped by the fluid medium together with a dash pot at the end of the assembly, and similarly the advancement of the counterweights is damped by the fluid medium and by a dash pot arrangement between the motor drive and the counterweights.

In order to integrate or combine weight and speed of movement of the material, a cone is rotated at a speed proportional to belt speed and serves to drive a friction wheel which is advanced along the cone surface by the motor drive for the counterweights in order to vary the speed ratio between the cone and wheel proportionally to variations in weight applied and sensed by the balance beam assembly. A differential mechanism senses the speed differential between the rotating cone and wheel for the purpose of driving a digital recording device through a variable speed disk and wheel so as to provide the correct total read-out for the load passing over the belt. At the same time a visual indication of instantaneous weight values per unit length of the conveyor belt may be provided through a separate indicator associated with and which follows movement of the countweight.

Calibration of the system is greatly simplified by adjustably mounting the cone for linear translation independently of the friction wheel so as to compensate for belt weight or tare-out, which must be substracted from the net load being weighed, the rotating cone being axially advanced until the differential mechanism shows no rotational movement. Thereafter a calibrated chain of known weight per foot may be added and allowed to run over the weighing section of the belt, and the variable speed disk and wheel between the differential and digital recorder is adjusted until the counter is proportional at a known ratio to the load applied. In this way the entire unit may be calibrated by two external adjustments made while the unit is operating, and the same is true in calibrating the system for weighing materials transported at different belt angles.

The above and other objects, advantages and features of the present invention will become more readily appreciated and understood from a consideration of the following detailed description of a preferred form of invention when taken together with the accompanying drawings, in which:

FIG. 1 is a side elevational view of the preferred form of scale installed on a conveyor frame.

FIG. 2 is a cross-sctional view taken about line 2—2 of FIG. 1.

FIG. 3 is a top plan view of the conveyor scale portion of the system shown in FIG. 1.

FIG. 4 is an enlarged elevational view of the conveyor scale.

FIG. 5 is a vertical section through the weigh and balance beam section of the scale.

FIG. 6 is a cross-sectional view taken about lines 6—6 of FIG. 4.

FIG. 7 is an enlarged view partially in section of the weigh and integrator sections.

FIG. 8 is an enlarged top view partially in section of the arrangement shown in FIG. 5.

FIG. 9 is a cross-sectional view taken about lines 9—9 of FIG. 5.

FIG. 10 is a view in detail of a portion of the weight translating mechanism; and FIG. 11 is a view of the chain drive for one side of the pivot bearing assembly in the weigh section taken about line 11—11 of FIG. 7.

Referring in detail to the drawings, a preferred form of conveyor belt scale unit 10 is shown mounted on a conveyor belt assembly having an endless belt 12 provided with upper and lower runs trained over idler assemblies 13 carried by spaced upper and lower beams 14 and 15. The beams are interconnected by girders 16 and cross beam 16′, and the beam structure is supported at the desired angle by standards 17. The upper idlers are comprised of intermediate rollers 18 mounted on a horizontal axis transversely of the belt and outside rollers 19 arranged at spaced intervals between the intermediate rollers on inclined axes so that the upper belt run will assume the form of a trough for advancement of the material over the scale unit 10. The lower idlers are shown as being comprised solely of intermediate rollers 18 together with a tension roller 20 mounted on the lower beam directly beneath the scale unit.

In accordance with the present invention, the scale 10 is capable of accurate weighing of material notwithstanding variations in the angular disposition of the belt assembly away from the horizontal. For this purpose, the outer housing of the scale unit has upper and lower spaced supporting shafts 21 and 22 extending transversely therethrough and being supported by brackets 23 depending downwardly on opposite sides of the frame in pivotal relation from upper stub shafts 24 mounted in bearing blocks 25 on either side of the conveyor frame. In turn, an upper support frame 28 pivotally supports inclined rollers 29, the frame being defined by pivotal arms 30 at the inner ends of the stub shafts 24 and having square-sectioned shafts 31 to rigidly support oppositely directed roller arms 32 for each of the rollers 29. It will be seen that the inclined rollers 29 are aligned with the inclined rollers 19 of the idler assembly, and a pulley assembly 26 forming part of the weigh section of the scale to be described includes a pair of spaced intermediate rollers 34 horizontal aligned with the intermediate rollers 18 on the idler assembly to aid in supporting the upper belt run.

From the foregoing, the entire conveyor belt assembly together with the roller support frame 28 is pivotal about a horizontal axis through the stub shafts 24; and when the belt is set at the desired angle, the scale unit should be secured against shifting under movement or vibration of the belt assembly. This may be suitably accomplished by outer supporting plates 36 mounted on the upper beams 14 and having support rods 37 at opposite ends of the plates 36 for mounting of a turn-buckle or connecting strap 38 which depends downwardly for connection to the lower support shaft 22. In this way, the scale may be rigidly supported in a level or horizontal attitude notwithstanding variations in angle of the conveyor belt assembly.

As shown in FIGS. 4 to 6, the conveyor belt scale is a modular unit having an elongated hollow casing 40 which is divided into an intermediate dynamic weigh section 42, a forward balance beam section 43 and a rearward integrating section 44. In the weigh section, a hollow body 45 of generally rectangular configuration is open at its upper end for the purpose of receiving a weigh block 46, the latter being operative to transmit the weight of material on the belt vertically from the pulley assembly 26 through the base of the block in off-center relation behind a counter-rotating pivot bearing assembly 48 wherein the axis of the pivot bearing assembly defines the fulcrum point of the entire weigh mechanism. In the balance beam assembly, counterweights 50 are mounted on balance arms 51 extending forwardly from each side of the pivot bearing assembly to counter-balance the weight transmitted vertically through the weigh block.

Considering in more detail the construction and arrangement of the weigh section, the pulley assembly 26 includes an upper weight-sensing pulley 52 spaced between the rolls 34 on a shaft 53 journaled at the upper end of the block 46, and a drive sprocket 54 is keyed for rotation on the shaft 53 within a recessed area 56 in the block. Each of the idler rolls 34 is journaled on a shaft 58, the latter being supported in a frame 60 at opposite ends of a common shaft 61 extending through the weigh block directly beneath the weight-sensing pulley 52. Here, the upper belt-engaging surfaces of the rolls 34 are aligned with the top surface of the weight-sensing pulley 52 in order to transmit the weight of material on the belt passing over the rolls 34 and pulley 52 vertically through the block to a pair of pin members 62 on opposite sides of the block and arranged at right angles to a pair of bearings 63 mounted on a common shaft 64 which extends transversely through the lower end of the block. In this way, essentially point contact is established between the pins 62 and bearings 63 in transmitting the weight from the bearings 63 in through the center axis of shaft 64 to a yoke assembly 65. The yoke 65 is defined by spaced channel members 66 of inverted generally U-shaped configuration interconnected by a common support plate 67 behind the weigh block. As shown, the outside of each channel member 66 is supported by a pivot bearing 68 on a shaft 68′, each shaft 68′ being supported in a bearing 69 at its outer end in an outer wall of the housing 45 and at its inner end in a bearing 69′ in an inner spaced vertical wall 70 of the housing. Accordingly, the weight of material is applied vertically through the center axis of the lower bearing shaft 64 which is disposed in off-center relation behind the axes of the counter-rotating pivot shafts 68′, the latter as stated defining the fulcrum of the entire weigh assembly.

The weigh block is held in vertical disposition with the shaft 64 accurately positioned in off-center relation behind the pivot shaft axes by upper bearing supports 72 and 73 being disposed at right angles to one another on a common shaft 74 in the block 46, and each pair of bearings are engaged by inner ends of adjustable centering rods 75 and 76 projecting inwardly at right angles to one another through the side, front and back walls of the housing 45. Similarly, the base of the weigh block is provided with a pair of bearing supports 77 on a shaft 77' engaged by front and back centering rods 78 which in cooperation with centering rods 79 projecting through the inner walls 70 maintain the lower end of the weigh block in vertical alignment so that the bearings 63 and supporting shaft 64 accurately centered between the inner walls 70 in offset relation behind the pivot bearing axes.

In sensing the average weight of material transported by the conveyor belt, the pulley 52 is at the same time caused to undergo rotation for the purpose of sensing the speed of travel of material. As a result, the drive sprocket 54 will follow rotation of the pulley to drive a chain represented at 81 which is trained over a driven sprocket 82. Chain 83 extends from a second driven sprocket 82' to a sprocket 84 on jack shaft 85 whereby to impart rotation to sprockets 86 and 87 at opposite ends of the jack shaft behind the weigh block, as shown in FIG. 7. The drive sprocket 86 drives a chain which is passed over a driven sprocket 88 on one of the pivot shafts 68' to impart rotation to one side of the pivot bearing assembly. In turn, the sprocket 87 has a chain passing over a sprocket 87' which imparts rotation to a reversing sprocket 89 for a chain drive between sprocket 90 on the jack shaft and driven sprocket 91 keyed on the other pivot shaft 68' so as to rotate its associated pivot bearing assembly in an opposite direction or counter to that of the first bearing assembly. In this way, any inertia or frictional resistance to free movement of the weigh mechanism in response to weight changes sensed through the weigh block is greatly minimized. Moreover, counter-rotation of the pivot bearing assemblies eliminates static running torque, nullifies the running torque of each bearing and enables more sensitive accurate response to weight changes.

Again, referring to the lower yoke assembly 65, the weigh balance arms 51 extend in horizontal, spaced parallel relation to one another from outside of the channel members 66 into the balance beam section which is partially filled with a damping fluid 103. The inner ends of the arms each extend through a bore 94 in each channel member and against the outer surface of each bearing 68 in order to closely follow movement of the yoke assembly in response to weight changes. The counterweights 50 are free to slide along the balance arms 51 under the control of a motor-driven slide 96, and counter-balancing weights, not shown, may be disposed on suitable rods projecting rearwardly from the yoke assembly in order to counter-balance the weights 50. A damping member in the form of interconnected paddle plates 102 is affixed to the leading ends of the balance arms 51, and the paddle plates when submerged in a fluid medium, filling the balance beam section to a level as designated at 103 beneath the electrical contacts to be described, will tend to dampen movement of the weigh arms in response to weight changes. In addition, a conventional dash pot, not shown, may be suspended at the outer free ends of the balance arms to cooperate with the paddle in damping movement of the balance arms. A contact arm 104 projects upwardly from the paddle members 102 above the fluid medium and is provided with a contact plate 106 which follows the pivotal deflection of the balance arms 51 to make or break contacts 107 and 108 disposed directly above and beneath the contact plate 106 for the purpose of driving a reversible electric motor 110 through electrical connections, not shown. It is to be noted that the balance arms 51, pivot shafts and pivot bearing axes are located in a common horizontal plane in order to minimize errors in the system. Use of the double balance arms 51 and pivot bearings also maintain a balance about the pivot bearings on the weigh block in order to more accurately sense weight changes.

As shown in FIGS. 5, 8 and 9, the motor-driven slide member 96 is interposed between the counterweights 50 and provided with upper and lower bushings 113 and 114 to receive upper and lower supporting shafts 115 and 116, respectively, which are mounted for extension between the front housing wall for the weigh block and the front wall of the scale beam housing, as shown in FIG. 5. The counterweights 50 are disposed symmetrically about opposite sides of the slide 96 and are secured thereto by a common support rod 117 extending transversely between a pair of upright support pins 118 and 119 mounted in an open transverse slot in the body of the slide with opposite ends of the rod affixed in grooves in the front surfaces of the counterweights by suitable attaching screws 120. In this way, the rod 117 will cause the counterweights to follow linear movement of the slide; and the rod being free to move vertically through the opening between the pins 118 and 119 will permit the counterweights to move vertically in response to pivotal deflecting of the balance beam, independently of the slide.

The slide member 96 is caused to advance in a linear direction by a chain drive 122 which is connected to opposite sides of a plunger 124, forming part of a dash pot assembly, extending horizontally through the body of the slide, the chain being trained for advancement over a driven sprocket 126 at the front end of the scale beam housing and over a drive sprocket 128 on the drive shaft of the reversible motor. The plunger 124 includes a piston 130 working in sealed relation within a chamber 132, the piston being biased to a normally centered position by compression springs 134 and further working against the oil or fluid entering the chamber from the housing so as to dampen vibrational movements transmitted from the chain drive to the piston.

The slide member 96 is motor-driven in response to deflection of the balance arms to indicate weight changes through a friction wheel 135 which is mounted on a shaft 136 journaled at the free end of a swivel block 137 within the slide member housing. The opposite end of the swivel block 137 is supported in journaled relation to a square-sectioned shaft 138 extending through the housing so that the drive wheel is free to swing in a vertical direction about the shaft 138 and specifically in such a manner that it can be biased upwardly against the surface of a rotating cone 140 by means of compression springs 139 which depend downwardly from the upper end of the slide housing, as shown in FIG. 9. Rotation of the drive wheel by the cone is transmitted to the shaft 138 by a chain 142 which is trained between a drive sprocket 143 on the shaft 136 and a driven sprocket 144 keyed for rotation on the shaft 138, the driven sprocket 144 being disposed within a cavity 145 within the block 137. In turn, bearing sleeves 146 on the block at opposite ends of the cavity 145 serve to mount the housing in journaled relation on opposite sides of the block.

The cone 140 is keyed for rotation on a shaft 148 which traverses the length of the scale beam and weigh section, the shaft being driven off the jack shaft through a bevel gear assembly represented at 149 so as to rotate at a speed comparable to belt speed. For a purpose to be described, the cone is axially adjustable on the shaft 148 by an elongated threaded rod 150 extending through rings 151 and 152 which are journaled at opposite ends of the cone. The rod 150 is rotated by a control knob 154 at the leading end of the balance beam section to impart linear movement to the cone along the shaft 148.

The friction drive wheel 135 is translatable along the surface of the cone, the wheel being of a size corresponding to the size of the larger end of the cone so as to advance between a one-to-one and a two-to-one speed ratio. Thus, under weight increases the friction drive wheel is advanced toward the smaller end of the cone so as to be driven at a faster rate by the cone, and is advanced toward the larger end of the cone under weight decreases so as to rotate at a slower rate. The square-sectioned shaft 138 traverses the length of the balance beam and weigh block sections and at its rearward terminal end has a bevel gear 156 for driving a bevel gear 157 on an input drive sleeve 158 on one side of a differential 160 in the integrating section. In turn, the cone 140 has a bevel gear 161 at its rearward terminal end which drives the bevel gear 157′ on the other input drive sleeve 159 of the differential 160 at a speed corresponding to belt speed but in a direction opposite to that of the one side driven by the shaft 138. In a conventional manner, the spider gear 162 rotates an output shaft 164 in response to the differential speed of rotation of the input sleeves. Thus, at a one-to-one ratio between the friction drive wheel 134 and rotating cone 140 the differential will remain stationary; however, under weight increases causing an increase in the rate of rotation of the shaft 138 the output shaft 164 will rotate at a rate proportional to the differential speed. Here it will be noted that the shaft 164 extends concentrically through the input sleeves 158 and 159 and is journaled at opposite ends by bearings 165 and 166 in the wall of the housing.

As shown in FIG. 4 a weight indicator 170 is disposed externally of the housing opposite the rotating cone and may be suitably provided with weight indications ranging from 0 to 100 pounds per belt foot where the "0" position on the scale corresponds to a one-to-one ratio between the friction drive wheel and cone and 100 pounds per belt foot would correspond to a two-to-one ratio between the rotating cone and drive wheel. A pointer 172 is mounted on the front surface of the slide member 96 to follow linear movement of the drive wheel relative to the rotating cone whereby to indicate weight changes on the scale. A tare calibration of the scale system can be readily made by running the belt empty and setting the cone by adjusting its control knob until the pointer 172 is at the "0" position on the scale. In reading weights up to 100 pounds the pointer 172 will advance between the "0" and 100 pound per belt foot position as the friction drive wheel is advanced from a one-to-one to two-to-one ratio along the rotating cone. It will be apparent however that the scale can be readily calibrated for increased weight changes simply by adding a known dead load to the belt during calibration and by adding the necessary counterweights to balance the scale for the known dead load.

In order to totalize the weight of the load running over the conveyor belt scale a counter is provided with a microswitch represented at $M_1$ which counts each revolution of the cone shaft 148 into the differential in response to engagement by a cam member 175, each revolution being equivalent to one belt foot, and the microswitch transmits the revolutions counted through a magnetic belt speed counter $C_1$. Another magnetic counter $C_2$ is provided for reading the totalized weight through a microswitch $M_2$ which counts the revolutions of the differential output shaft 164 through an adjustable weight recording shaft 176 for comparison with the weight recorded on a recorder R. Here the differential shaft 164 is provided with a frictional drive disk 177 and the weight recording shaft has a driven disk 178 at one end which is disposed at right angles to, and slightly ahead of, the disk 177 to engage its front surface. The weight recorder shaft is axially adjusted by a threaded rod 180 having a control knob 181 to advance the disk 178 inwardly and outwardly in a radial direction between the center and outer periphery of the disk 177 in order to control the speed of the weight recording shaft relative to the speed of the differential output shaft. Suitably the recorder R may be an eight-digit counter with a double wheel, such as, that manufactured by Durant Company and has a totalizing, weight-recording scale 184 associated with the weight recording shaft to indicate and display the number of revolutions of the shaft and to provide a weight reading identical to that of the weight recording counter $C_2$.

The weight recording scale 180 can be readily calibrated to indicate the totalized weight with respect to belt speed by placing a known weight on the scale and advancing same at a known rate of speed. Thus for instance by employing a known chain load which travels at a given rate of speed, the belt speed counter $C_1$ will read the belt speed and the weight recording counter $C_2$ will read the weight per foot of belt speed. The weight recorder R may therefore be calibrated to give the same reading as the counter $C_2$. In this way, the recording scale can be calibrated to correct for errors introduced by variations in angle of the belt to horizontal as well as errors induced by speed changes, tension or slack in the belt together with extraneous moments of force which when applied to the belt scale would otherwise modify the actual load.

From the foregoing, it will be appreciated that the conveyor belt scale system of the present invention is unique in providing a modular unit capable of translating the weight of the belt and materials directly to a balance beam assembly without pivot joints, linkages or hydraulic or electrical components; and specifically by transmitting the weight through a bearing load associated with counter-rotating pivot bearings so as to minimize stiction, or dynamic friction, and inertia which would otherwise resist sensitive movement of the balance beam in response to weight changes.

Moreover, the system provides for ease of external adjustment in taring out when the system is located and installed under a conveyor belt, and will achieve an accurate, long average definition of zero or null balance of the balance beam by employing a differential device which can be easily calibrated simultaneously with the balance beam and translating mechanism. Here a common friction drive is employed to rotate both the differential and integrating mechanism and enables calibration of the system relative to a known weight by adjusting the speed of the counter to coincide with a known weight traveling at a given speed. Moreover, the operator can visually check the accuracy of the system by comparing the count between the two electrical counters when utilizing a known weight since one counter provides a count of belt speed and the other provides a count of shaft rotation in response to variations in weight.

Again, the entire system is mounted within a compact housing which can be installed within the conveyor frame structure to provide an accurate, non-compensating adjustment which is adaptable to varying angles of the conveyor belt, since the weight sensing components may be properly maintained in normal relation to the load by pivoting the entire unit about the axis of the weight-sensing pulley on the weigh block.

It is therefore to be understood that while a preferred form of the present invention has been described, various modifications and changes may be made without departing from the spirit and scope of the present invention, as defined by the appended claims.

What is claimed is:

1. In a conveyor scale unit for determining the average weight of material transported on a conveyor belt,
   a housing,
   a weigh scale in said housing including a weight-sensing member, a fulcrum defined by a pivot bearing assembly mounted in said housing, and suspension means suspending said weight-sensing member in vertically offset relation to said pivot bearing assembly including counter-balancing means to counter-balance the weight of material applied through said weight-sensing member,
   further including means supporting said housing in pivotal relation to the conveyor belt with said weight-sensing member being aligned to sense the weight of the material carried by the conveyor belt, and said counter-balancing means being defined by a balance beam assembly journaled by said suspension means on said pivot bearing assembly for pivotal deflection in response to variations in weight sensed by said weight-sensing member.

2. In a conveyor scale unit for determining the average weight of material transported on a conveyor belt,
a housing,
a weigh scale in said housing including a weight-sensing member, a fulcrum defined by a pivot bearing assembly mounted in said housing, and suspension means suspending said weight-sensing member in vertically offset relation to said pivot bearing assembly including counter-balancing means to counter-balance the weight of material applied through said weight-sensing member,
said weight-sensing means being in the form of a weigh block having weigh bearings at the lower end of said block, and
said suspension means being defined by a yoke assembly supporting said weigh bearings on a center line in vertically offset, horizontally spaced relation to said pivot bearing assembly.

3. In a conveyor scale unit according to claim 2, said pivot bearing assembly having pivot bearings disposed on opposite sides of said weigh block, means for continuously rotating said pivot bearings in opposite directions, and said yoke assembly being suspended on said counter-rotating pivot bearings to support said weigh bearings in centered relation between said pivot bearings at the lower end of said weigh block.

4. In a conveyor scale unit according to claim 3, said weigh block further including downwardly facing, generally cylindrical pin members disposed at right angles to said weigh bearings and being engageable with the upper surfaces of said weigh bearings to transmit the weight of material sensed by said weigh block to said weigh bearings.

5. In a conveyor scale unit according to claim 3, said weigh block further including an upper weight-sensing pulley engageable with the undersurface of said conveyor belt to sense the weight of material on the belt, said weight-sensing pulley being further characterized by being rotatable by the conveyor belt to detect the rate of travel of material thereon, and means responsive to rotation of said weight-sensing pulley to rotate said pivot bearings on opposite sides of said weigh block in opposite directions of rotation.

6. In a conveyor scale unit according to claim 3, said weigh bearings being defined by a pair of bearing members mounted on a common shaft on opposite sides of said weigh block parallel to the axis of rotation of said pivot bearings, and a pair of upper bearing members mounted in said weigh block at right angles to and in contacting relation to the upper surfaces of said lower weigh bearings to apply the weight transmitted to said weight-sensing pulley through said upper bearing members to said lower weigh bearings.

7. In a conveyor scale unit being adapted for mounting beneath a load-carrying belt, the combination of
a weight-sensing member disposed beneath the load-carrying belt to sense the weight of the load thereon,
counter-rotating support means on opposite sides of said weight-sensing member having a balance beam assembly projecting forwardly therefrom, said counter-rotating support means defined the fulcrum between the point of application of the load through said weight-sensing member and said balance beam assembly, and
said balance beam assembly being disposed symmetrically about a common horizontal plane through the rotational axis of said counter-rotating support means.

8. In a conveyor scale unit according to claim 7, said balance beam assembly having a pair of balance arms extending forwardly from each of said counter-rotating support means, said balance arms being disposed in spaced parallel relation to one another and having counterweights slidable thereon, and
a fluid medium in said housing to dampen movement of said balance beam assembly in response to fluctuations in weight sensed by said conveyor scale unit.

9. In a conveyor scale unit according to claim 8, said balance beam assembly further including an electrical contact plate at the forward free ends of said balance arms,
a reversible drive motor including electrical contacts in the path of said contact plate to energize said motor in response to positive or negative changes in weight, and
a slide member between said motor and said counterweights adapted to be reversibly driven by said motor to advance said counterweights in a direction along said balance arms compensating for weight changes.

10. In a conveyor scale unit according to claim 9, said slide member including a housing interposed between said counterweights, said counterweights being so connected to said slide member housing as to follow linear movement of said housing while being free to follow pivotal deflection of said balance arms independently of said slide members, and
a power transmission drive between said drive motor and said translating mechanism including a dash pot interconnecting said translating mechanism and said power transmission drive.

11. In a conveyor scale unit according to claim 10, further including a rotatable cone member, means driving said cone at a rate corresponding to the rate of travel of said belt member over said weight-sensing member, and
said slide member including a friction drive wheel pivotally mounted thereon for engagement with the conical surface of said rotatable cone, said drive wheel being advanced in response to weight variations to a point on said surface of said cone to be rotated at a speed proportional to the weight of material per unit length of the belt.

12. A modular conveyor scale unit for determining the average weight of material transported on a conveyor belt in which the conveyor belt is supported for advancement by a conveyor frame provided with upper and lower runs of idler assemblies, said conveyor scale unit comprising:
a unitary housing divided into an intermediate weigh section, a forward balance beam section and a rearward integrator section,
a weigh scale suspended in the weigh section of said housing including a weigh block provided with an upper weight-sensing pulley being aligned with the upper run of said idler assemblies to be engaged by said weight-sensing conveyor belt whereby to sense the weight of material transported thereon, and
means suspending said housing from said conveyor frame in pivotal relation about a horizontal axis through the axis of said weight-sensing pulley.

13. A modular conveyor scale unit according to claim 12, further including a balance beam assembly projecting forwardly from said weigh block, and
the weigh section of said housing further including counter-rotating support members on opposite sides of said weigh block to define a fulcrum between the weight applied to said weight-sensing pulley and said balance beam assembly.

14. A modular conveyor-scale unit according to claim 13, said weigh block having weigh bearings at the lower end thereof and a yoke assembly to support said weigh bearings on a center line in offset, horizontally spaced relation to said counter-rotating support members.

15. A modular conveyor scale unit according to claim 12, said balance beam assembly comprising a pair of balance arms extending forwardly through the weigh section of said housing into the balance beam section, said balance arms each including a counterweight slidable thereon, and the balance beam section having a fluid medium to dampen pivotal deflection of said balance arms in response to variations in weight applied to said weight-sensing pulley.

16. A modular conveyor scale unit according to claim 15, said balance arms having a fluid damping plate member disposed between the free ends of said balance arms and an electrical contact plate associated with said fluid damping plate,
- a reversible drive motor including electrical contacts in the path of said contact plate to energize said motor in response to positive or negative changes in weight, and
- drive means between said motor and said counterweights adapted to be reversibly driven by said motor to advance said counterweights in a direction along said balance arms to compensate for weight changes.

References Cited

UNITED STATES PATENTS

| | | | |
|---|---|---|---|
| 2,394,593 | 2/1946 | Christmann | 177—16 |
| 3,155,181 | 11/1964 | Chambers | 177—16 |
| 3,339,650 | 9/1967 | Carr | 177—16 |

FOREIGN PATENTS

| | | |
|---|---|---|
| 259,814 | 5/1963 | Australia. |

RICHARD B. WILKINSON, Primary Examiner

G. H. MILLER, Jr., Assistant Examiner

U.S. Cl. X.R.

177—213; 198—39